United States Patent [19]
Kleewein et al.

[11] Patent Number: 5,903,893
[45] Date of Patent: May 11, 1999

[54] METHOD AND APPARATUS FOR OPTIMIZING A MERGE-JOIN OPERATION ACROSS HETEROGENEOUS DATABASES

[75] Inventors: James Charles Kleewein; Eileen Tien Lin; Hemant Maheshwari, all of San Jose, Calif.

[73] Assignee: International Business Machines Corporation, Armonk, N.Y.

[21] Appl. No.: 08/931,404

[22] Filed: Sep. 15, 1997

[51] Int. Cl.⁶ .................................................. G06F 17/30
[52] U.S. Cl. .............................................................. 707/10
[58] Field of Search .................................................. 707/10

[56] References Cited

U.S. PATENT DOCUMENTS

| | | |
|---|---|---|
| 5,146,590 | 9/1992 | Lorie et al. . |
| 5,201,046 | 4/1993 | Goldberg et al. . |
| 5,241,648 | 8/1993 | Cheng et al. . |
| 5,287,493 | 2/1994 | Jacopi . |
| 5,367,671 | 11/1994 | Feigenbaum et al. . |
| 5,367,675 | 11/1994 | Cheng et al. . |
| 5,560,005 | 9/1996 | Hoover et al. . |
| 5,584,024 | 12/1996 | Shwartz . |
| 5,590,321 | 12/1996 | Lin et al. . |
| 5,594,898 | 1/1997 | Dalal et al. . |
| 5,596,748 | 1/1997 | Kleewein et al. . |
| 5,611,076 | 3/1997 | Durflinger et al. . |
| 5,613,142 | 3/1997 | Matsumoto . |
| 5,694,591 | 12/1997 | Du et al. ........................................ 707/2 |
| 5,721,896 | 2/1998 | Ganguly et al. ............................. 707/2 |
| 5,802,511 | 9/1998 | Kouchi et al. ................................ 707/2 |
| 5,806,059 | 9/1998 | Tsuchida et al. ............................ 707/2 |
| 5,842,207 | 11/1998 | Fujiwara et al. ........................... 707/10 |

OTHER PUBLICATIONS

IBM Technical Disclosure Bulletin, vol. 30–No. 2, Jul. 1987, pp. 750–757, "Fast Table Joining in Relational Data Bases and Fast Row Retrieval".

IBM Technical Disclosure Bulletin, vol. 38–No. 12, Dec. 1995 p. 317, "Method for Optimizing for N Rows in a Database Management System".

IBM Technical Disclosure Bulletin, vol. 31, No. 5, Oct. 1988, pp. 301–303, "Interpretive Database Merge Join Operation".

*Primary Examiner*—Jack M. Choules
*Attorney, Agent, or Firm*—Ohlandt, Greeley, Ruggiero & Perle

[57] ABSTRACT

An improved join operation is performed between data in at least two tables, with one of the tables stored in a remote database (hereafter "remote table") and another table stored in a local database (hereafter "local table"). The entry values in both the local table and the remote table are accessible in an ordered manner, based upon an order of the entry values. The method of the join operation generally includes the steps of: determining a count of a number of entry values that reside in the local table that are to be joined with entry values in the remote table; comparing the count with a threshold value, and (i) if the count exceeds the threshold value, issuing a query to the remote table to fetch a range of entry values therefrom, the range determined by the range of entry values to be joined from the local table; and (ii) if the count does not exceed the threshold value, issuing a query to the remote table to fetch each specific entry value that matches the entry values to be joined from the local table.

14 Claims, 3 Drawing Sheets

METHOD AND APPARATUS FOR OPTIMIZING A MERGE-JOIN OPERATION ACROSS HETEROGENEOUS DATABASES

CROSS-REFERENCE TO RELATED PATENT APPLICATIONS

This Application is related to the following co-pending patent applications:

"HETEROGENEOUS DATABASE SYSTEM WITH DATA SOURCE EXTENSIBILITY", Inventor(s): Kleewein et al., U.S. Ser. No. 08/929,809;

"SYSTEM AND METHOD FOR PROVIDING A SINGLE APPLICATION PROGRAM INTERFACE FOR HETEROGENEOUS DATABASES", Inventor(s): Kleewein et al., U.S. Ser. No. 08/931,008;

"METHOD AN APPARATUS FOR OPTIMIZING QUERIES ACROSS HETEROGENEOUS DATA BASES", Inventor(s): Kleewein et al., U.S. Ser. No. 08/929,877;

"METHOD AND APPARATUS FOR CACHING RESULT SETS FROM QUERIES TO A REMOTE DATABASE IN A HETEROGENEOUS DATABASE SYSTEM", Inventor(s): Kleewein et al., U.S. Ser. No. 08/931,003;

"METHOD AND APPARATUS FOR DEFERRING LARGE OBJECT RETRIEVALS FROM A REMOTE DATABASE IN A HETEROGENEOUS DATABASE SYSTEM", Inventor(s): Kleewein et al., U.S. Ser. No. 08/929,642;

"HETEROGENEOUS DATABASE SYSTEM WITH DYNAMIC COMMIT PROCEDURE CONTROL", Inventor(s): Kleewein et al., U.S. Ser. No. 08/931,029; and "METHOD AND APPARATUS FOR ACCESSING OF LARGE OBJECT DATA SEGMENTS FROM A REMOTE DATABASE", Inventor(s): Maheshwari et al., U.S. Ser. No. 08/931,002.

FIELD OF THE INVENTION

This invention relates to an application program interface which provides transparent access to heterogeneous databases and, more particularly, to such an interface which enables an improved merge-join operation between data from a table at a local database and data from a table at a remote database.

BACKGROUND OF THE INVENTION

A continuing demand exists to join multiple databases so as to enable transparent access to data stored therein. "Transparent" implies that an application program at a specific site is able to access data from all connected databases, without being aware of the origin of the data, nor of any incompatibilities which might exist between a local database and any of the plurality of coupled remote databases. It is to be understood that the terms "remote" and "local", as used herein, not only refer to physical locations, but also to databases that are located at a single site (e.g., on one or more computers), but are controlled by different operating systems or database protocols.

In order to provide a transparent interface for heterogeneous databases, the prior art has employed one database as an interface and has enabled that interface, under control of a database management system (DBMS), to access data from other databases in accordance with data entries contained in an interface table. Upon receiving a query, the receiving DBMS performs a query optimization procedure to decide upon an efficient method for accessing the requested data.

During such a query optimization action, various types of join methods are often considered. A join method is used when rows from an "outer" table are concatenated to rows of one or more other tables (i.e., "inner" tables), in accord with a determined criteria. As used herein, the term "table" includes any tabular listing of data. An outer table is one from which a search name is retrieved and an inner table is one from which data is retrieved, based on the search name retrieved from the outer table.

A merge-join is one of a plurality of join methods used in responding to a database query, wherein data from an outer table is joined with data from an inner table. In SQL (i.e., a commonly used query language) a merge-join operation is specified by a predicate that is similar to:

table1.column1|=table2.column2.

To perform a merge-join operation, both the inner table and the outer table are ordered, either by sorting or by accessing the required data via an index access. The outer table involved in the merge-join operation is then scanned just once and the inner table is scanned once unless there are repeated identical values in the outer table. If there are repeated identical values in the outer table, a group of rows in the inner table may be scanned again.

The following is an example of a merge-join operation, as performed in the prior art. Assume that column A in tables T1 and T2 has the following values:

| Outer Table<br>T1:column A | Inner Table<br>T2:column A |
| --- | --- |
| 2 | 1 |
| 3 | 2 |
| 3 | 2 |
|   | 3 |
|   | 3 |

The steps for doing a merge join between T1 and T2 are:
  Read the first row from T1; the value for A is "2";
  Scan T2 until a match is found, and then join the two rows that match;
  Keep scanning T2 while the columns match, joining matching rows;
  When the "3" in T2 is read, go back to T1 and read the next row;
  The next value in T1 is "3" which matches T2, so join the rows;
  Keep scanning T2 while the columns match, join matching rows;
  The end of T2 is reached;
  Go back to T1 to get the next row—note that the next value in T1 is the same as the previous value from T1, so T2 is scanned again starting at the first "3" in T2 (the database manager remembers this position).

When a merge-join operation is performed between tables residing in a remote database and a local database, respectively, either (i) the table from the remote database is imported in its entirety to the local database, where the merge-join operation is performed; or (ii) the table from the local database is exported to the remote database, where the merge-join operation is performed. In both cases, a complete table is communicated between databases, increasing the communications cost of the merge-join operation.

Accordingly, it is an object of this invention to provide an improved method and apparatus for performing a merge-join operation, when a remote database includes a table with values to be joined to a table in a local database.

It is another object of this invention to provide an improved method and apparatus for performing a merge-join operation, wherein reduced communication costs are achieved.

SUMMARY OF THE INVENTION

An improved join operation is performed between data in at least two tables, with one of the tables stored in a remote database (hereafter "remote table") and another table stored in a local database (hereafter "local table") The entry values in both the local table and the remote table are accessible in an ordered manner, based upon an order of the entry values. The method of the join operation generally includes the steps of: determining a count of a number of entry values that reside in the local table that are to be joined with entry values in the remote table; comparing the count with a threshold value, and (i) if the count exceeds the threshold value, issuing a query to the remote table to fetch a range of entry values therefrom, the range determined by the range of entry values to be joined from the local table; and (ii) if the count does not exceed the threshold value, issuing a query to the remote table to fetch each specific entry value that matches the entry values to be joined from the local table.

DETAILED DESCRIPTION OF THE INVENTION

Figure 1:
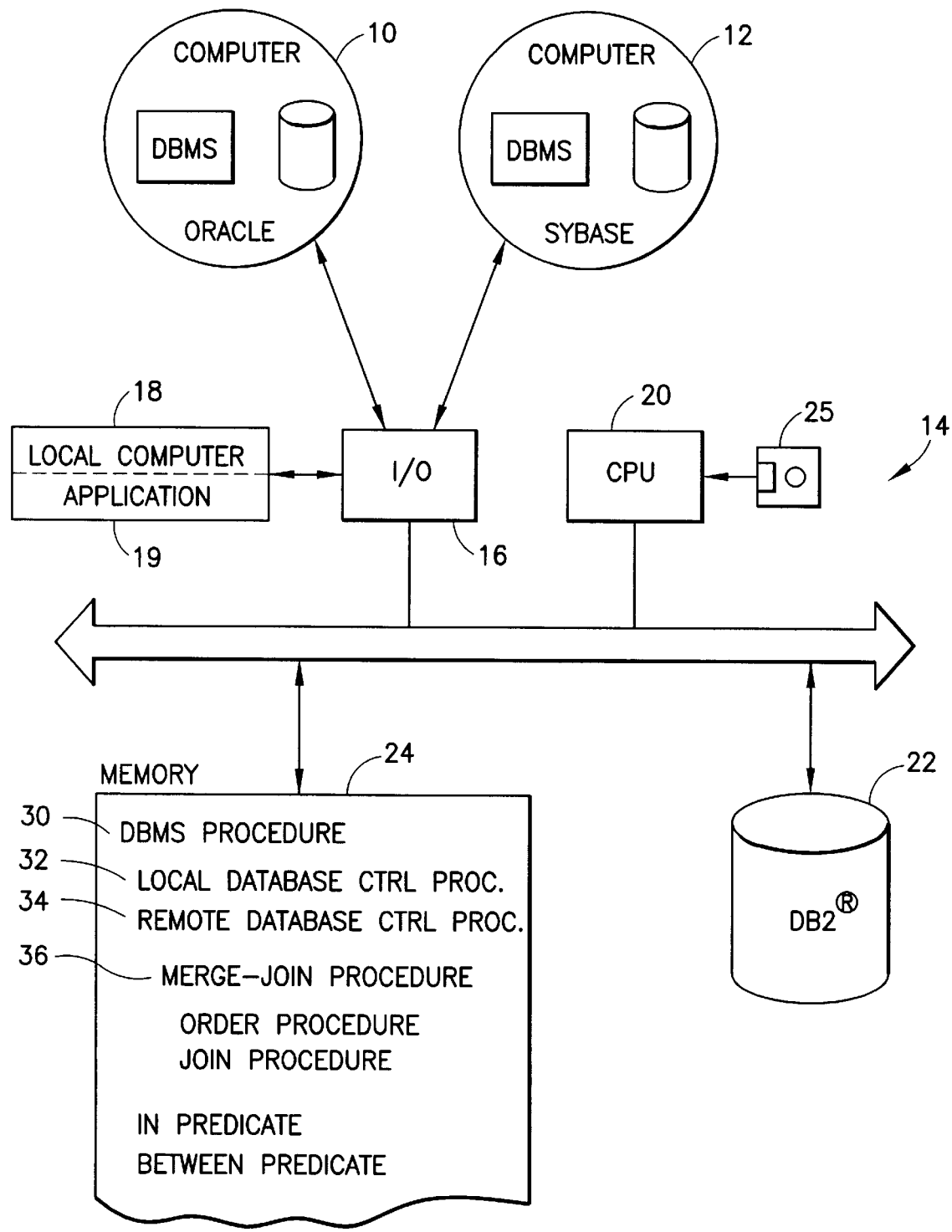
FIG. 1 is a high-level block diagram of a database system which incorporates the invention.

Referring to FIG. 1, a heterogeneous database system includes, for example, three separate database management systems (DBMS's). A computer 10 includes an Oracle DBMS, a computer 12 includes a Sybase DBMS, and a computer/server 14 includes a DB2 DBMS. (Oracle is a trademark of the Oracle Corporation, Sybase is a trademark of the Sybase Corporation, and IBM and DB2 are trademarks of the International Business Machines Corporation). Computer/server 14 includes an input/output (I/O) module 16 which enables communication with computers 10 and 12 and various local computers 18, etc.

As will be hereafter understood, an application program 19 running on local computer 18 is able to access data from any connected database, whether the data is housed in computers 10, 12 or 14, and at all times it appears to application program 19 as though the data is coming from computer/server 14. A central processing unit (CPU) 20, a disk file 22 where the data comprising the DB2 database is stored and a memory 24 are all contained within computer/server 14. Within memory 24 are a plurality of procedures which provide overall control of the DB2 database and enable transparent access to and from the Oracle and Sybase databases in computers 10 and 12.

Each of the aforesaid databases can be accessed by a standard data access language such as SQL (structured query language). SQL functions as a standard interface language which substantially all databases can understand and respond to.

While the procedures to be considered below which enable implementation of the invention are shown in FIG. 1 as already loaded into memory 24, it is to be understood those procedures can be loaded into CPU 20 via a memory disk, tape or other storage device 25 in the well known manner. In any of these cases, the operation of CPU 20, in carrying out the functions of the invention, are controlled by the procedures and data stored in either memory 24 or storage device 25.

Memory 24 schematically illustrates some of the entries stored therein. DBMS procedure 30 includes local database control procedure 32 and remote database control procedure 34. Local database control procedure 32 is, for instance, responsive to a request from application program 19 running on local computer 18, to retrieve requested data from the DB2 database stored on disk file 22. Remote database control procedure 34 performs the same function, but with respect to the Oracle and Sybase databases contained on computers 10 and 12, respectively. In all cases, the functioning of procedures 32 and 34 are transparent to application program 19.

Memory 24 further includes a merge-join procedure 36 which is invoked by DBMS procedure 30 if an optimizing sub-procedure (contained within DBMS procedure 30) indicates that it is a most efficient join procedure to use to respond to a query from application program 19.

As described above, a merge-join procedure requires a joinder of data from at least two tables wherein the data has been sorted so as to be available for access in an ordered manner. A merge-join action is then accomplished in accordance with a condition set by the query from application program 19.

As will be understood from the description below, DBMS procedure 30 controls merge-join procedure 36 to access data from a remotely stored table (i.e., an "outer" table) in order to carry out its procedure. In doing so, merge-join procedure 36 employs either an "IN" predicate or a "BETWEEN" predicate in an SQL statement that is issued to the outer table. An IN predicate requires that data items listed in a query be specifically retrieved and returned to merge-join procedure 36. Thus, if data items 1, 6, 9 and 10 are listed in an SQL query, only matching data items 1, 6, 9 and 10 in an outer table are returned. By contrast, a BETWEEN predicate contained in an SQL statement requires that all data between an upper value and a lower value, inclusive, be returned in response to the query. Accordingly, in lieu of specifying 1, 6, 9 and 10, a BETWEEN predicate specifies only data items 1 and 10, with it being understood that all data items falling between one and 10, inclusive, are to be returned in response to the SQL query.

If both tables required for a merge-join operation are already present in memory 24 of computer/server 14, the improved merge-join procedure of the invention is not required. However, if either one or both of the tables, from which data is to be accessed, resides in a remote database (e.g., computer 10 or computer 12), then at least one table must be imported to the computer where the merge-join action will occur (e.g., computer/server 14).

As will be hereafter understood, the invention requires that the inner table be present in computer/server 14 in order for the invention to be implemented. Accordingly, if the inner table is found to reside in a remote database, it is imported into computer/server 14 for the subsequent merge-join operation. Further, if the data in the inner table is not ordered, a sort procedure must be carried out with respect thereto.

Hereafter, it is assumed that the outer table is present in a remote database. In the prior art, to carry out a merge-join action, the remote outer table is imported into computer/server 14. If, however, only a portion of the outer table is required to be joined to data from an inner table to respond to a query from application program 19, the prior art procedure still imports the entire table, resulting in importation of data that is not required.

Figure 2:
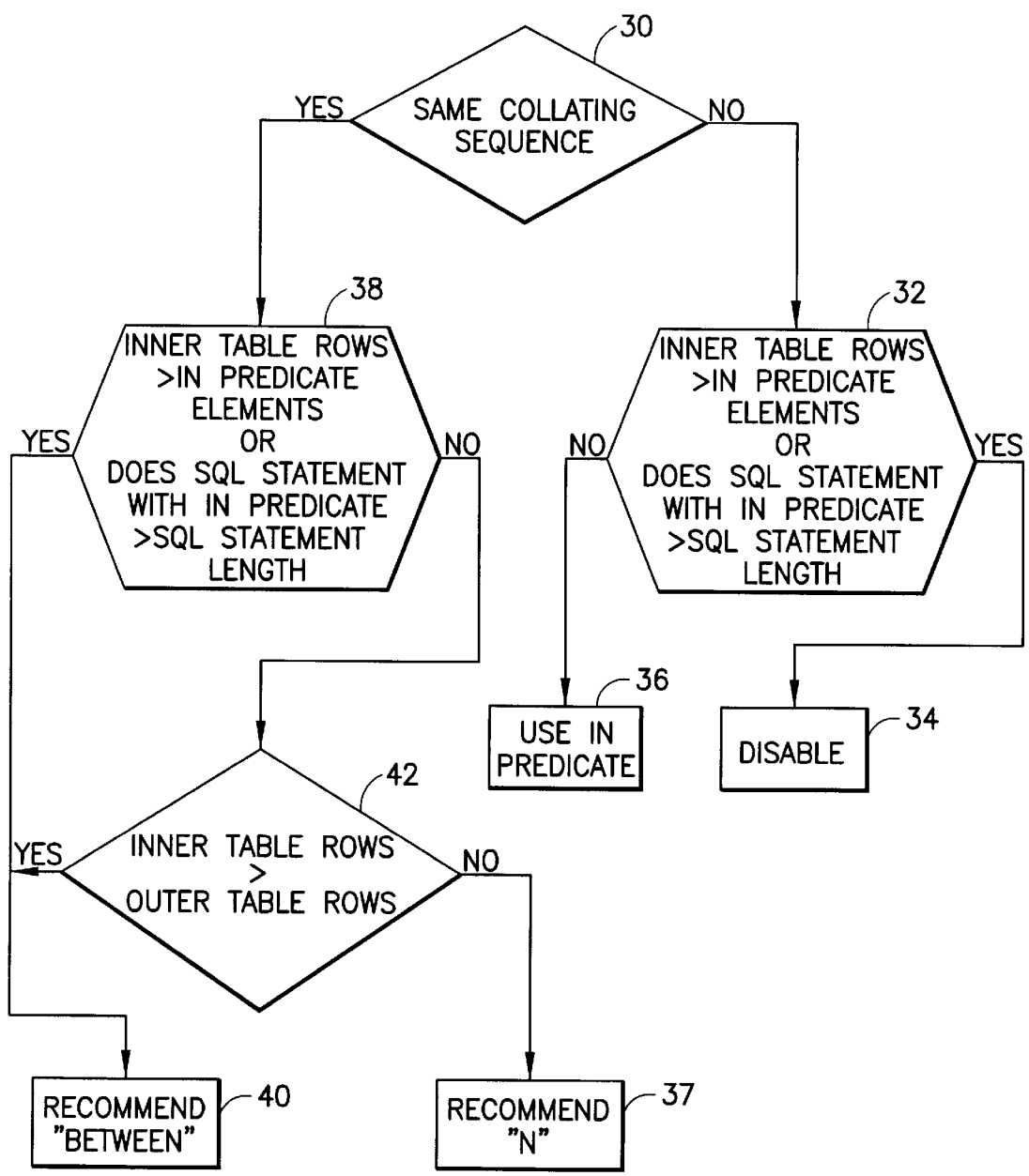
FIG. 2 is a logical flow diagram which illustrates operation of the method of the invention during compile time.

Initially, at compile time, as illustrated in FIG. 2, an initial "recommendation" is derived as to whether to use an IN predicate or a BETWEEN predicate. As shown at decision box 30, it is initially determined if the collating sequences of the DBMS's which control the two tables are identical. In other words, do the respective DBMS's assign weights to the various characters in an identical fashion. More specifically, a collating sequence of a first DBMS could consider a lower case "a" to have a value less than a "A", while a collating sequence of a second DBMS could consider the value "A" as less than "a". In such a case, an equality comparison (which an IN predicate uses) will produce accurate results, but a BETWEEN predicate will not, as it uses an inequality comparison. Accordingly, if the collating sequences are found to be different, only an IN predicate is applicable.

Assuming that the collating sequences are different, it is next determined (decision box 32) if the number of rows in the inner table exceeds the number of elements allowed in an IN predicate or if the maximum length of an SQL statement with an IN predicate exceeds the SQL statement length allowance. If yes in either case, a merge-join procedure in accordance with the invention is not applicable, i.e., it is disabled (box 34). If no, the compile procedure requires that an IN predicate be used—because the BETWEEN predicate requires a value comparison which requires identical collating sequences (box 36).

Returning to decision box 30, if a same collating sequence is found between the respective DBMS's, then it is next determined whether the number of rows in the inner table exceeds a number of elements allowed in an IN predicate or if the SQL statement with an IN predicate exceeds the statement length allowed for an SQL statement (decision box 38). If yes in either case, the compile procedure recommends use of a BETWEEN predicate (box 40). By contrast, if a no answer results from either of the queries in decision box 38, it is determined whether the number of inner table rows exceeds the number of outer table rows (decision box 42). If yes, a BETWEEN predicate is recommended (box 40), otherwise, an IN predicate is recommended (box 36).

The decision indicated in decision box 42 enables a minimization of the number of rows of the outer table that are to be retrieved. More specifically, if the number of inner table rows (or the number of distinct joining column values in the inner table) is greater than the number of outer table rows, then it is known that a certain number of joining values which would be part of the IN predicate (if IN was used) will not find a match in the outer table. Hence a BETWEEN predicate is recommended.

Figure 3:
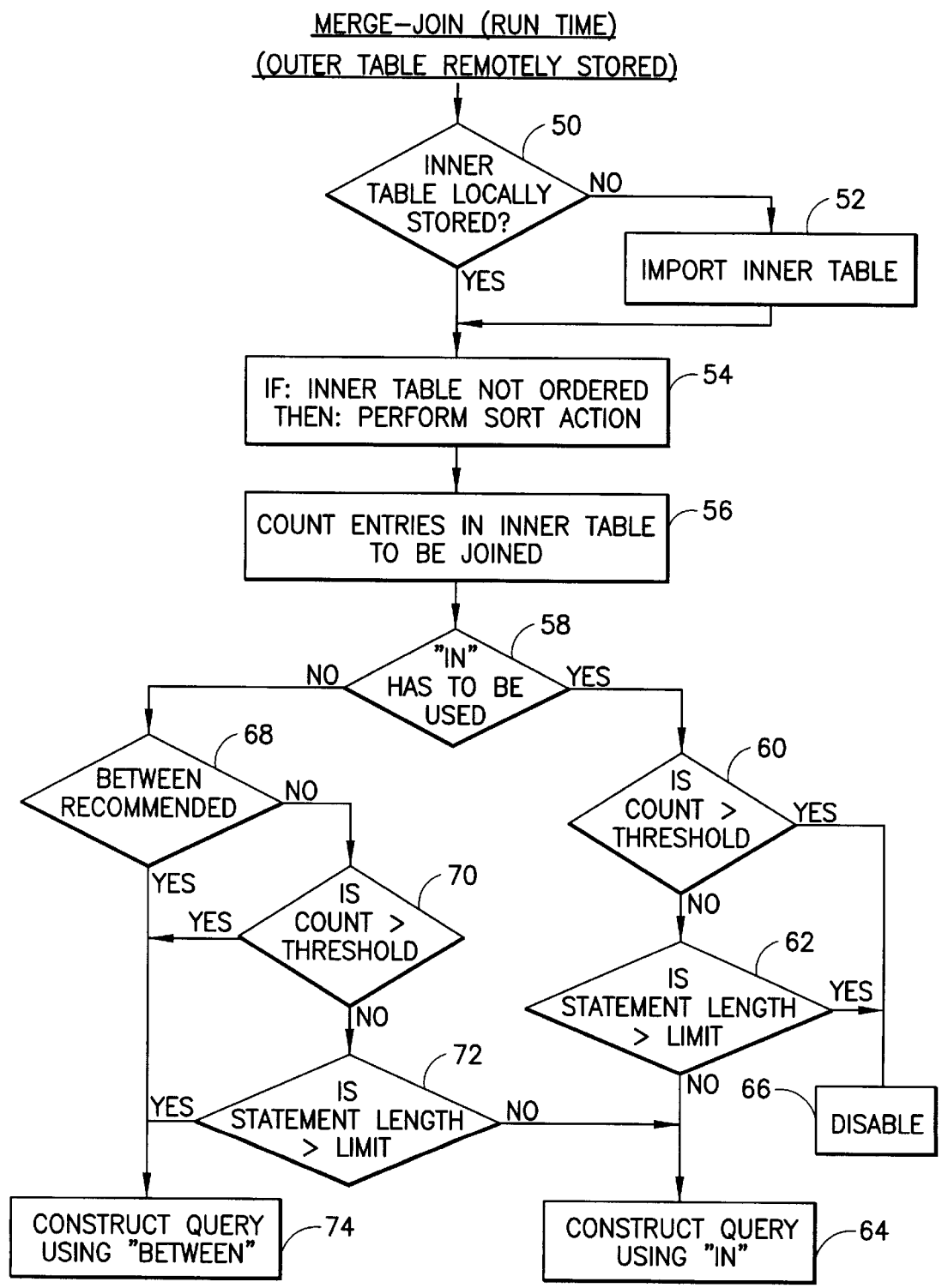
FIG. 3 is a logical flow diagram which illustrates operation of the method of the invention during run time.

Turning to FIG. 3, a logic flow diagram illustrates the operation of merge-join procedure 36, during run-time, when an outer table is stored at a remote database. Initially, merge-join procedure 36 determines if a required inner table is locally stored (decision box 50). If no, a message is provided to DBMS 30 to import the inner table from the remote database (box 52). If yes, action is taken to determine if the inner table is ordered, and if not, a sort action is taken to enable an ordered access to entries in the inner table (box 54). Similarly, once the inner table is imported (box 52) it is subjected to the same sort action, if required (box 54).

Thereafter, the query from application program 19 is examined and a count of the number of data values that are to be subject to the merge/join action is determined (box 56). For instance, if the query specifies a specific number of data names or values to be subjected to the merge-join operation, that number of values is the count. If, by contrast, the query is insufficiently determinate that no specific count can be derived therefrom, the count is made equal to the number of rows in the inner table.

Next, it is determined if an IN predicate is required to be used (decision box 58). If yes, the count value is compared to a threshold value(decision box 60, which threshold value may be the number of discrete values that a remote database will accept in an SQL query statement. If the count value does not exceed the threshold value, it is next determined of the query statement length exceeds the limit for an IN predicate (decision box 62) If no, then all requirements have been satisfied for use of the In predicate. The procedure then employs the IN predicate (box 64) in constructing the SQL statement and lists therein the specific data values to be accessed from the outer table. If a yes emanates from either decision box 60 or 62, then the procedure of the invention is abandoned (box 66) as being inapplicable.

By contrast, if an IN predicate is not required to be used (decision box 58), it is next determined if a BETWEEN predicate is recommended (decision box 68) . If no, the count value is compared to the aforesaid threshold value (decision box 70) . If the count value does not exceed the threshold value, it is next determined if a query statement length with the values required for the IN predicate exceeds the limit for a query statement (decision box 72). If no, then the IN predicate is used (box 64) as above described.

If a BETWEEN predicate is recommended (decision box 68) and either the count value is greater than the threshold or the statement length of an IN predicate exceeds the limit (decision boxes 70, 72, the BETWEEN predicate (box 74) is utilized in constructing the SQL statement.

A remote database responds to the IN predicate by accessing only the rows of the outer table which include the specified data values. If, by contrast, a BETWEEN predicate is received, the remote database accesses all rows between the upper and lower limits that are specified within the received SQL statement.

Upon receipt of the data at computer/server 14, assuming that the outer table data is ordered, a join action is performed in order to prepare a response to the query.

In summary, this merge-join enhancement is principally applicable in cases when the outer table is a remote table (i.e., it does not reside in computer/server 14). The inner table has to be locally stored in computer/server 14, i.e., it could either be a local table or a remote table which is retrieved from the remote data-source and stored as a temporary table on computer/server 14.

A set of distinct values is derived from the inner table. If the number of distinct values is over a threshold, a BETWEEN predicate is preferably used to filter the data retrieved from the outer table. If the number of distinct values is under a threshold, an IN predicate is generated which identifies the exact joining values.

Hereafter an example will be presented which further explains the invention. Assume, a query requires a join between two tables O_T1, residing on remote Oracle database 10, and S_T1, residing on remote Sybase database 12. DBMS procedure 30 decides to do a merge-join of these tables on computer/server 14 with O_T1 as the inner table and S_T1 as the outer table. The values in the tables are:

| O_T1 (INNER) Column 1 | S_T1 (OUTER) Column 1 |
| --- | --- |
| 1 | 2 |
| 2 | 3 |
| 5 | 4 |
| 6 | 6 |
|   | 7 |
|   | 9 |
|   | 10 |

Merge-join procedure 36 first fetches table O_T1 and stores it locally. If the number of distinct values in O_T1 is under a threshold limit, then the number is used as part of the IN predicate in the SQL query generated by DBMS procedure 30 to fetch outer table S_T1. The SQL query is like: "Select C1 from S_T1 where C1 in ('1','2','5','6')". The outer table in this case looks like this:

| S_T1 Column 1 |
| --- |
| 2 |
| 6 |

If the number of distinct values in O_T1 is over a threshold limit, then it uses the "BETWEEN" predicate. The SQL query that would be generated by DBMS procedure 30 to retrieve S_T1 would look like: "Select C1 from S_T1 where C1 between '1' and '6'". The outer table would look like this:

| S_T1 Column 1 |
| --- |
| 2 |
| 3 |
| 4 |
| 6 |

The result is a savings of communication costs by not fetching unnecessary rows from the outer table and an improvement in the performance of the merge-join operation due to a reduced cardinality of the outer table.

It should be understood that the foregoing description is only illustrative of the invention. Various alternatives and modifications can be devised by those skilled in the art without departing from the invention. For example, it has been assumed above that the query plan is either to be executed at the local database or at a remote database. It is also within the scope of this invention to make a choice between query plans to be executed on one of several remote databases. Accordingly, the present invention is intended to embrace all such alternatives, modifications and variances which fall within the scope of the appended claims.

We claim:

1. A method for performing an enhanced join operation at a local processor between data from at least two tables, one table stored in a remote database (hereafter "remote table") and a second table stored in a second database (hereafter "local table") in association with said local processor, said method comprising the steps of:

a) during a compile time, analyzing (i) a received query, (ii) data relevant to said local table and said remote table and (iii) data entries to be joined from said local table, and providing a recommended predicate to be dispatched to said remote table in response to said received query, a first predicate listing each data value to be accessed from said remote table and a second predicate defining a range of data values to be accessed from said remote table;

b) during a run time, determining if a count of a number of data values in the local table to be joined with data values in the remote table exceeds or does not exceed a threshold value; and (i) if the count exceeds the threshold value and said a second predicate is recommended, employing said second predicate in a query to a database management system (DBMS) which controls the remote table to access a range of data values and associated data therefrom; and (ii) if the count does not exceed the threshold value and said first predicate is recommended, employing said first predicate in a query to said DBMS to access a specific list of data values and associated data from said remote table.

2. The method as recited in claim 1, wherein said range in said second predicate is determined by the range of data values to be joined from the local table.

3. The method as recited in claim 1, wherein said specific list of data values in said first predicate are determined from data values to be joined from the local table.

4. The method as recited in claim 1, wherein said count is a number of specific data values that can be accommodated by a standard query language (SQL) query with said first predicate.

5. The method as recited in claim 1, wherein step (a) comprises the following additional steps:

determining if said DBMS which controls said remote table and a DBMS which controls said local table utilize different collating sequences; and if yes, requiring that said first predicate be employed in said query.

6. The method as recited in claim 5, comprising the further step of:

if identical collating sequences are found to be utilized in each said DBMS, and either a number of rows in the local table exceeds a predetermined threshold, or said first predicate which lists specific entries to be joined exceeds a query statement length, recommending that said second predicate be used.

7. The method as recited in claim 6, comprising the further step of:

if identical collating sequences are found to be utilized in each said DBMS, and (i) if either a number of rows in the local table does not exceed a predetermined threshold, or (ii) said first predicate which lists specific entries to be joined does not exceed a query statement length, and (iii) the local table includes a greater number of rows than the remote table, then recommending that said first predicate be used.

8. A memory media for controlling a local processor to perform an enhanced join operation between data from at least two tables, one table stored in a remote database (hereafter "remote table") and a second table stored in a second database (hereafter "local table") in association with said local processor, said memory media comprising:

a) means operative during a compile time to operate said local processor to analyze (i) a received query, (ii) data relevant to said local table and said remote table and (iii) data entries to be joined from said local table, and to provide a recommended predicate to be dispatched to said remote table in response to said received query, a first predicate listing each data value to be accessed from said remote table and a second predicate defining a range of data values to be accessed from said remote table;

b) means operative during a run time to operate said local processor to determine if a count of a number of data values in the local table to be joined with data values in the remote table exceeds or does not exceed a threshold value; and (i) if the count exceeds the threshold value and said second predicate is recommended, to cause said local processor to employ said second predicate in a query for dispatch to a database management system (DBMS) which controls the remote table to access a range of data values and associated data therefrom; and (ii) if the count does not exceed the threshold value and said first predicate is recommended, to cause said local processor to employ said first predicate in a query for dispatch to said DBMS to access a specific list of data values and associated data from said remote table.

9. The memory media as recited in claim 8, wherein said range in said second predicate is determined by the range of data values to be joined from the local table.

10. The memory media as recited in claim 8, wherein said specific list of data values in said first predicate are determined from data values to be joined from the local table.

11. The memory media as recited in claim 8, wherein said count is a number of specific data values that can be accommodated by a standard query language (SQL) query with a first predicate.

12. The memory media as recited in claim 8, wherein means (a) controls said local processor to determine if said DBMS which controls said remote table and a DBMS which controls said local table utilize different collating sequences, and if yes, to require that said first predicate be employed in said query.

13. The memory media as recited in claim 12, wherein means a) controls said local processor to recommend that said second predicate be used (i) if identical collating sequences are found to be utilized in each said DBMS, and either (ii) a number of rows in the local table exceeds a predetermined threshold, or (iii) said first predicate which lists specific entries to be joined exceeds a query statement length.

14. The memory media as recited in claim 13, wherein means a) controls said local processor to recommend that said first predicate be used (i) if identical collating sequences are found to be utilized in each said DBMS, and (ii) if either a number of rows in the local table does not exceed a predetermined threshold, or (iii) said first predicate which lists specific entries to be joined does not exceed a query statement length, and (iv) the local table includes a greater number of rows than the remote table.

* * * * *